United States Patent
Hong

(10) Patent No.: US 11,317,302 B2
(45) Date of Patent: Apr. 26, 2022

(54) MINIMIZATION OF DRIVE TEST CONFIGURATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/967,272

(22) PCT Filed: Feb. 8, 2018

(86) PCT No.: PCT/CN2018/075850
§ 371 (c)(1),
(2) Date: Aug. 4, 2020

(87) PCT Pub. No.: WO2019/153199
PCT Pub. Date: Aug. 15, 2019

(65) Prior Publication Data
US 2021/0099895 A1 Apr. 1, 2021

(51) Int. Cl.
*H04W 8/24* (2009.01)
*H04W 24/02* (2009.01)
(Continued)

(52) U.S. Cl.
CPC ............. *H04W 24/02* (2013.01); *H04W 4/80* (2018.02); *H04W 8/24* (2013.01); *H04W 24/10* (2013.01);
(Continued)

(58) Field of Classification Search
CPC ....... H04W 24/02; H04W 4/80; H04W 76/11; H04W 76/27; H04W 8/24; H04W 24/10; H04W 84/12
See application file for complete search history.

(56) References Cited

U.S. PATENT DOCUMENTS

| 9,402,197 B2 | 7/2016 | Fujishiro |
| 2013/0095860 A1 | 4/2013 | Hapsari et al. |

(Continued)

FOREIGN PATENT DOCUMENTS

| CN | 101365223 A | 2/2009 |
| CN | 101646197 A | 2/2010 |

(Continued)

OTHER PUBLICATIONS

Second Office Action of the Chinese Application No. 201880000124.6, dated Apr. 20, 2021, with English translation, (26).
(Continued)

*Primary Examiner* — Chuong A Ngo
(74) *Attorney, Agent, or Firm* — Arch & Lake LLP

(57) ABSTRACT

Methods, apparatuses, and non-transitory computer-readable storage mediums are provided. The MDT configuration method includes setting MDT configuration information for performing an MDT measurement on a specified network device, adding the MDT configuration information to specified signaling, and sending the specified signaling to a base station, so that the base station determines, according to the MDT configuration information, a terminal to be configured that meets a specified MDT measurement condition, and then sends the MDT configuration information to said terminal, and said terminal performing MDT measurement on the specified network device according to the MDT configuration information.

20 Claims, 10 Drawing Sheets

---

MDT configuration information about MDT measurement performed on a specified network device is set — 110

The MDT configuration information is added to specified signaling — 120

The specified signaling is sent to a base station to cause the base station to, after determining a terminal to be configured consistent with a specified MDT measurement condition according to the MDT configuration information, send the MDT configuration information to the terminal to be configured to cause the terminal to be configured to perform the MDT measurement on the specified network device according to the MDT configuration information — 130

(51) Int. Cl.
*H04W 4/80* (2018.01)
*H04W 76/11* (2018.01)
*H04W 76/27* (2018.01)
*H04W 24/10* (2009.01)
*H04W 84/12* (2009.01)

(52) U.S. Cl.
CPC ............ *H04W 76/11* (2018.02); *H04W 76/27* (2018.02); *H04W 84/12* (2013.01)

(56) References Cited

U.S. PATENT DOCUMENTS

| | | |
|---|---|---|
| 2014/0044002 A1 | 2/2014 | Fujishiro |
| 2014/0295840 A1* | 10/2014 | Keskitalo .............. H04W 24/10 455/436 |
| 2015/0163745 A1 | 6/2015 | Kim et al. |
| 2015/0312850 A1* | 10/2015 | Li ........................ H04W 48/16 370/329 |
| 2016/0044567 A1 | 2/2016 | Baghel et al. |
| 2016/0044591 A1 | 2/2016 | Pao et al. |
| 2016/0080958 A1 | 3/2016 | Rinne et al. |
| 2016/0100378 A1 | 4/2016 | Chang et al. |
| 2016/0316405 A1 | 10/2016 | Balan et al. |
| 2016/0373992 A1 | 12/2016 | Jung et al. |
| 2018/0160416 A1 | 6/2018 | Mitsui et al. |
| 2018/0206183 A1 | 7/2018 | Li et al. |
| 2018/0242181 A1 | 8/2018 | Tsutsui |
| 2018/0324617 A1* | 11/2018 | Schmidt ................ H04W 24/02 |
| 2019/0335390 A1 | 10/2019 | Li et al. |
| 2021/0099895 A1 | 4/2021 | Hong |

FOREIGN PATENT DOCUMENTS

| | | |
|---|---|---|
| CN | 101998463 A | 3/2011 |
| CN | 102149108 A | 8/2011 |
| CN | 102457890 A | 5/2012 |
| CN | 102595459 A | 7/2012 |
| CN | 102685793 A | 9/2012 |
| CN | 102860063 A | 1/2013 |
| CN | 102892129 A | 1/2013 |
| CN | 103039106 A | 4/2013 |
| CN | 103458437 A | 12/2013 |
| CN | 103460750 A | 12/2013 |
| CN | 104581777 A | 4/2015 |
| CN | 104717614 A | 6/2015 |
| CN | 104853432 A | 8/2015 |
| CN | 104904260 A | 9/2015 |
| CN | 104904286 A | 9/2015 |
| CN | 105103605 A | 11/2015 |
| CN | 106031215 A | 10/2016 |
| CN | 106899988 A | 6/2017 |
| CN | 107251585 A | 10/2017 |
| CN | 108401510 A | 8/2018 |
| EP | 2860883 A1 | 4/2015 |
| EP | 2934051 A1 | 10/2015 |
| EP | 3300429 B1 | 1/2020 |
| JP | 2016508328 A | 3/2016 |
| RU | 2359410 C1 | 6/2009 |
| WO | 2004079514 A2 | 9/2004 |
| WO | 2011005751 A2 | 1/2011 |
| WO | 2014165832 A1 | 10/2014 |
| WO | 2014175882 A1 | 10/2014 |
| WO | 2015168861 A1 | 11/2015 |
| WO | 2016190254 A1 | 12/2016 |
| WO | 2016208955 A1 | 12/2016 |
| WO | 2017043296 A1 | 3/2017 |

OTHER PUBLICATIONS

International Search Report to PCT Application No. PCT/CN2018/075850 dated Oct. 24, 2018 with English translation, (4p).
Written Opinion of International Application No. PCT/CN2018/075850, dated Oct. 24, 2018 with English translation, (3p).
Supplementary European Search Report in the European application No. 18904934.9, dated Aug. 18, 2021.
First Office Action of the Indian application No. 202047038112, dated Aug. 31, 2021.
International Search Report in the International Application No. PCT/CN2018/073624, dated Sep. 29, 2018 with English translation, (2p).
English translation of the Written Opinion of the International Search Authority in the International Application No. PCT/CN2018/073624, dated Sep. 29, 2018, (4p).
3GPP TS 37.320 V10.2.0 (Jun. 2011), Universal Terrestrial Radio Access (UTRA) and Evolved Universal Terrestrial Radio Access (E-UTRA); Radio measurement collection for Minimization of Drive Tests (MDT); Overall description Stage 2 (Release 10), (17p).
First Office Action of the Chinese Application No. 201880000005.0, dated Oct. 9, 2020, (29p).
Second Office Action of the Chinese Application No. 201880000005.0, dated Dec. 30, 2020, (27p).
Third Office Action of the Chinese Application No. 201880000005.0, dated Mar. 12, 2021, (25p).
Notice of Allowance of the Russian Application No. 2020126104, dated Nov. 6, 2020, (19p).
"3rd Generation Partnership Project; Technical Specification Group Radio Access Network; Evolved Universal Terrestrial Radio Access (E-UTRA); Radio Resource Control (RRC); Protocol specification (Release 15)", 3GPP Draft; 36331-F01, 3rd Generation Partnership Project (3GPP), Mobile Competence Centre 350, Route Des Lucioles; F-06921 Sophia-Antipolis Cedex; France, Jan. 11, 2018 (Jan. 11, 2018), (764p).
Extended European Search Report in the European Application No. 18900940.0, dated Aug. 12, 2021, (10p).
First Office Action of the Korean Application No. 10-2020-7023227, dated May 20, 2021, (17p).
Notice of Allowance of the Korean Application No. 10-2020-7023227, dated Nov. 4, 2021, (4p).
CMCC, Nokia, Xiaomi, OPPO, New WID: Bluetooth/WLAN measurement collection in MDT [online], 3GPP TSG RAN #78 RP-172820, Internet<URL:http://www.3gpp.org/ftp/tsg_ran/TSG_RAN/TSGR_78/Docs/RP-172820.zip>, Dec. 2, 20171, 2015, (4p).
First Office Action of the Japanese Application No. 2020-537751, dated Aug. 3, 2021, (8p).
Notice of Allowance of the Japanese Application No. 2020-537751, dated Dec. 14, 2021, (5p).
Office Action of the Indian Application No. 202047035780, dated Sep. 10, 2021, (6p).
Non-Final Office Action of the U.S. Appl. No. 16/962,506, dated Dec. 9, 2021, (34p).

* cited by examiner

MINIMIZATION OF DRIVE TEST CONFIGURATION METHOD AND APPARATUS

CROSS-REFERENCE TO RELATED APPLICATION

This application is a national phase application based on PCT/CN2018/075850, filed on Feb. 8, 2018, the content of which is incorporated herein by reference.

TECHNICAL FIELD

The present disclosure generally relates to the field of communications, and more particularly, to a minimization of drive test (MDT) configuration method and device.

BACKGROUND

A drive test (DT) or drive tests (DTs) may reflect a status of a network, play a direct role in measuring and evaluating a performance index of the network, and point out a network problem. In a related art, conventional network optimization is based on DT data. A level, quality, and other network data may be acquired through a DT instrument, the network data is analyzed to find the network problem, and network optimization is further performed for a problem region. However, conventional network optimization usually requires heavy human resource, material resource and fund investments, and also has a very high requirement on an experience of a network optimization worker.

SUMMARY

For solving the problems in the related art, embodiments of the present disclosure provide an MDT configuration method and device.

According to a first aspect of embodiments of the present disclosure, an MDT configuration method is provided, which may be applied to a core network device and include that: MDT configuration information about MDT measurement performed on a specified network device is set; the MDT configuration information is added to specified signaling; the specified signaling is sent to a base station to cause the base station to, after determining a terminal to be configured consistent with a specified MDT measurement condition according to the MDT configuration information, send the MDT configuration information to the terminal to be configured, and to cause the terminal to be configured to perform the MDT measurement on the specified network device according to the MDT configuration information.

According to a second aspect of embodiments of the present disclosure, an MDT configuration method is provided, which may be applied to a base station and include that: specified signaling sent by a core network device is received, the specified signaling including MDT configuration information about MDT measurement performed on a specified network device which is set by the core network device; a terminal to be configured consistent with a specified MDT measurement condition is determined according to the MDT configuration information; and the MDT configuration information is sent to the terminal to be configured to cause the terminal to be configured to perform the MDT measurement on the specified network device according to the MDT configuration information.

According to a third aspect of embodiments of the present disclosure, an MDT configuration method is provided, which may be applied to a terminal to be configured, the terminal to be configured being a terminal determined by a base station according to MDT configuration information about MDT measurement performed on a specified network device which is set by a core network device and consistent with a specified MDT measurement condition, the method including that: MDT configuration information sent by the base station is received, the MDT configuration information being the MDT configuration information about the MDT measurement performed on the specified network device which is set by the core network device; and the MDT measurement is performed on the specified network device according to the MDT configuration information.

According to a fifth aspect of embodiments of the present disclosure, an MDT configuration apparatus is provided, which may be applied to a base station and include: a signaling receiving module, configured to receive specified signaling sent by a core network device, the specified signaling including MDT configuration information about MDT measurement performed on a specified network device which is set by the core network device; a determination module, configured to determine a terminal to be configured consistent with a specified MDT measurement condition according to the MDT configuration information; and an information sending module, configured to send the MDT configuration information to the terminal to be configured to cause the terminal to be configured to perform the MDT measurement on the specified network device according to the MDT configuration information.

According to a sixth aspect of embodiments of the present disclosure, an MDT configuration apparatus is provided, which may be applied to a terminal to be configured, the terminal to be configured being a terminal determined by a base station according to MDT configuration information about MDT measurement performed on a specified network device which is set by a core network device and consistent with a specified MDT measurement condition, the device may include: an information receiving module, configured to receive MDT configuration information sent by the base station, the MDT configuration information being the MDT configuration information about the MDT measurement performed on the specified network device which is set by the core network device; and a measurement module, configured to perform the MDT measurement on the specified network device according to the MDT configuration information.

According to a seventh aspect of embodiments of the present disclosure, a non-transitory computer-readable storage medium is provided, in which a computer program may be stored, and the computer program may be configured to execute the MDT configuration method in the first aspect.

According to an eighth aspect of embodiments of the present disclosure, a non-transitory computer-readable storage medium is provided, in which a computer program may be stored, and the computer program may be configured to execute the MDT configuration method in the second aspect.

According to a ninth aspect of embodiments of the present disclosure, a non-transitory computer-readable storage medium is provided, in which a computer program may be stored, and the computer program may be configured to execute the MDT configuration method in the third aspect.

According to a tenth aspect of embodiments of the present disclosure, an MDT configuration apparatus is provided, which may be applied to a core network device and include: a processor; and a memory configured to store instructions executable by the processor.

The processor may be configured to: set MDT configuration information about MDT measurement performed on a specified network device; add the MDT configuration information to specified signaling; and send the specified signaling to a base station to cause the base station to, after determining a terminal to be configured consistent with a specified MDT measurement condition according to the MDT configuration information, send the MDT configuration information to the terminal to be configured to cause the terminal to be configured to perform the MDT measurement on the specified network device according to the MDT configuration information.

According to an eleventh aspect of embodiments of the present disclosure, an MDT configuration apparatus is provided, which may be applied to a base station and include: a processor; and a memory configured to store instructions executable by the processor.

The processor may be configured to: receive specified signaling sent by a core network device, the specified signaling including MDT configuration information about MDT measurement performed on a specified network device which is set by the core network device; determine a terminal to be configured consistent with a specified MDT measurement condition according to the MDT configuration information; and send the MDT configuration information to the terminal to be configured to cause the terminal to be configured to perform the MDT measurement on the specified network device according to the MDT configuration information.

According to a twelfth aspect of embodiments of the present disclosure, an MDT configuration apparatus is provided, which may be applied to a terminal to be configured, the terminal to be configured being a terminal determined by a base station according to MDT configuration information about MDT measurement performed on a specified network device which is set by a core network device and consistent with a specified MDT measurement condition, the device may include: a processor; and a memory configured to store instructions executable by the processor.

The processor may be configured to: receive MDT configuration information sent by the base station, the MDT configuration information being the MDT configuration information about the MDT measurement performed on the specified network device which is set by the core network device; and perform the MDT measurement on the specified network device according to the MDT configuration information.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
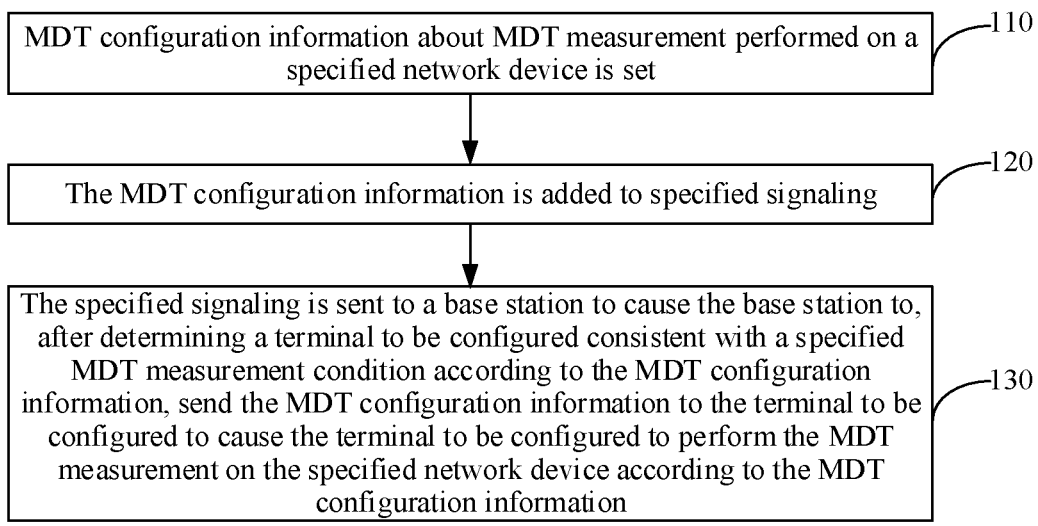
FIG. 1 is a flow chart showing an MDT configuration method, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, indication information may also be called second information and, similarly, the second information may also be called indication information. For example, term "if" used here may be explained as "while" or "when" or "responsive to determining", which depends on the context.

A DT or DTs may reflect a status of a network, play a direct role in measuring and evaluating a performance index of the network, and point out a network problem. In a related art, conventional network optimization is based on DT data. A level, quality, and other network data may be acquired through a DT instrument, the network data is analyzed to find the network problem, and network optimization is further performed for a problem region. However, conventional network optimization usually requires heavy human resource, material resource and fund investments, and also has a very high requirement on an experience of a network optimization worker.

An MDT technology mainly acquires a related parameter required by the network optimization through a measurement report reported by a mobile phone.

For making MDT more effective, present application scenarios thereof mainly include coverage optimization, capacity optimization, mobility optimization, quality of service (QoS) guaranteeing, and the like.

At present, the MDT technology is mainly applied to/in an outdoor scenario. In the outdoor scenario, a terminal may perform accurate positioning and measurement configuration based on a global positioning system (GPS). However, along with the development of mobile communication technologies, more and more mobile communications and traffic have been generated indoors. In addition, more and more BT devices and WLAN devices have been deployed indoors. A conventional MDT technology is confronted with some challenges.

However, in an existing MDT mechanism, a core network device cannot configure BT/WLAN-based MDT measurement for a terminal, and if the terminal is expected to perform the BT/WLAN-based MDT measurement, the core network device is required to perform related configuration.

Regarding the problems mentioned above, the present disclosure discloses an MDT configuration method. In the method, a core network device may set MDT configuration information about MDT measurement performed on a specified network device (for example, a BT device or a WLAN device), and then send the MDT configuration information to a base station through specified signaling (for example, initial context setup request signaling). The base station, after receiving the MDT configuration information, may determine a terminal to be configured which is consistent with (or which meets) a specified MDT measurement condition according to the MDT configuration information, and then send the MDT configuration information to the terminal to be configured to cause the terminal to be configured to perform the MDT measurement on the specified network device according to the MDT configuration information. Therefore, configuration of BT/WLAN-based MDT measurement for the terminal by the core network device is implemented, and accuracy of MDT measurement is improved.

The technical solutions provided in embodiments of the present disclosure will be described below with specific embodiments.

Figure 2:
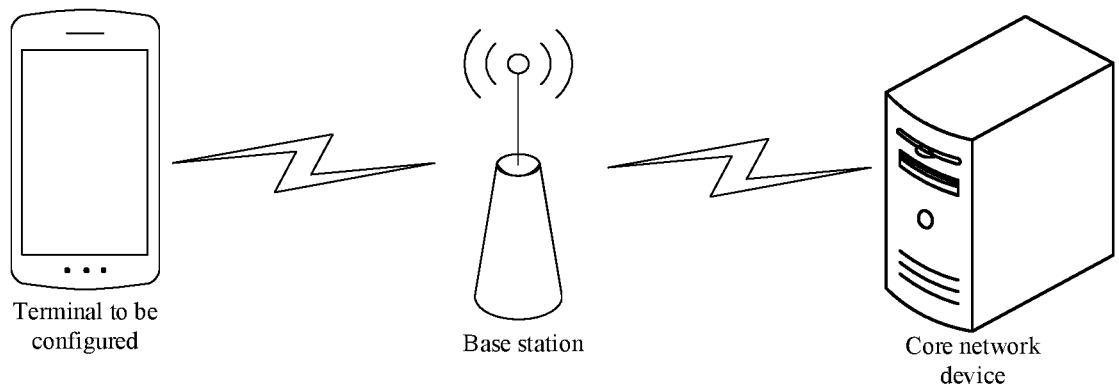
FIG. 2 is a diagram of an application scenario diagram of an MDT configuration method, according to an exemplary embodiment.

FIG. 1 is a flow chart showing an MDT configuration method, according to an exemplary embodiment. FIG. 2 is a diagram of an application scenario of an MDT configuration method, according to an exemplary embodiment. The MDT configuration method may be applied to a core network device. For example, the core network device may be a mobility management entity (MME), and is configured for signaling management, tracking area management, gateway selection, and the like. As illustrated in FIG. 1, the MDT configuration method may include steps 110 to 130 as follows.

In step 110, MDT configuration information about MDT measurement performed on a specified network device (that is, MDT configuration information for performing MDT measurement on a specified network device) is set. The specified network device, for example, may be a predetermined network device. For example, the MDT configuration information may be set or configured by the core network device.

In the embodiment of the present disclosure, the core network device sets the MDT configuration information for a purpose of notifying a base station that it supports MDT measurement over the specified network device and notifying the base station to select a proper terminal to perform the MDT measurement on the specified network device, and a measurement parameter required by MDT measurement over the specified network device is configured.

In an embodiment, the specified network device may be a BT device and/or a WLAN device. Therefore, the core network device may set MDT configuration information about MDT measurement performed on the BT device and/or the WLAN device.

In an embodiment, the specified network device may be the BT device and/or the WLAN device, and the MDT configuration information set by a core network may include: (1) an MDT mode for BT and/or WLAN MDT measurement; and/or (2) measurement region information for BT and/or WLAN MDT measurement; and/or (3) information of BT device required to be measured; and/or (4) SSID information of the WLAN device required to be measured.

The MDT mode may be real-time MDT and may also be stored MDT.

In step 120, the MDT configuration information is added to specified signaling. The specified signaling, for example, may be one or more pre-existing signals.

In the embodiment of the present disclosure, the core network device may send the MDT configuration information to the base station through the specified signaling. The specified signaling may be existing signaling. For example, first signaling is initial context setup request signaling.

In step 130, the specified signaling is sent to a base station to cause the base station to, after determining a terminal to be configured consistent with a specified MDT measurement condition according to the MDT configuration information, send the MDT configuration information to the terminal to be configured to cause the terminal to be configured to perform the MDT measurement on the specified network device according to the MDT configuration information.

In an exemplary scenario, as illustrated in FIG. 2, a terminal, a base station and a core network device are included. The core network device may set MDT configuration information about MDT measurement performed on a specified network device (for example, a BT device or a WLAN device), and then send the MDT configuration information to the base station through specified signaling (for example, initial context setup request signaling). The base station, after receiving the MDT configuration information, may determine a terminal to be configured consistent with a specified MDT measurement condition according to the MDT configuration information, and then send the MDT configuration information to the terminal to be configured to cause the terminal to be configured to perform the MDT measurement on the specified network device according to the MDT configuration information. Therefore, configuration of BT/WLAN-based MDT measurement for the terminal by the core network device is implemented, and accuracy of MDT measurement is improved.

It can be seen from the embodiment that the MDT configuration information about MDT measurement performed on the specified network device is set, the MDT configuration information is added to the specified signaling, and the specified signaling is sent to the base station. The base station, after determining the terminal to be configured consistent with the specified MDT measurement condition according to the MDT configuration information, may send the MDT configuration information to the terminal to be configured to cause the terminal to be configured to perform the MDT measurement on the specified network device according to the MDT configuration information, such that configuration of specified network device-based MDT measurement for the terminal by the core network device is implemented, and reliability of MDT measurement is improved.

Figure 3:
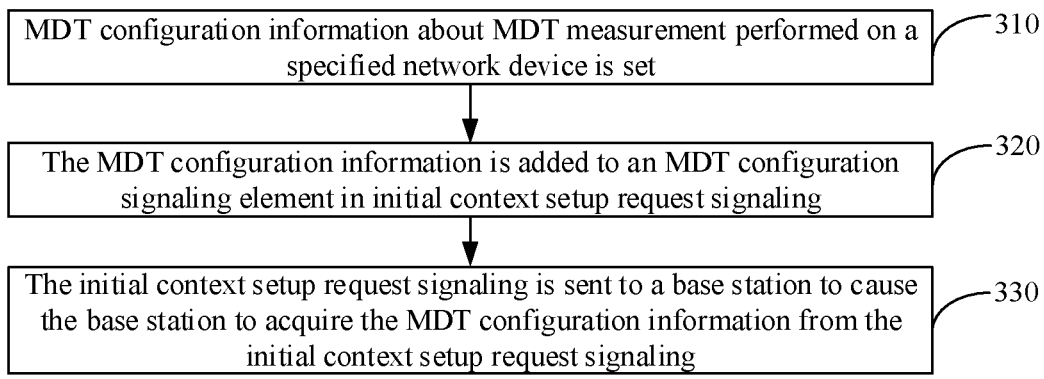
FIG. 3 is a flow chart showing another MDT configuration method, according to an exemplary embodiment.

FIG. 3 is a flow chart showing another MDT configuration method, according to an exemplary embodiment. The MDT configuration method may be applied to a core network device and is established based on the method illustrated in FIG. 1. Specified signaling is initial context setup request signaling which includes a tracking activation information element, and the tracking activation information element includes an MDT configuration signaling element. As illustrated in FIG. 3, the MDT configuration method may include steps 310 to 330 as follows.

In step 310, MDT configuration information about MDT measurement performed on a specified network device is set. The step is identical with step 110, and will not be elaborated herein.

In step 320, the MDT configuration information is added to the MDT configuration signaling element in the initial context setup request signaling.

In step 330, the initial context setup request signaling is sent to a base station to cause the base station to acquire the MDT configuration information from the initial context setup request signaling.

It can be seen from the embodiment that the MDT configuration information is added to the MDT configuration signaling element in the initial context setup request signaling, and then the initial context setup request signaling is sent to the base station to cause the base station to acquire the MDT configuration information from the initial context setup request signaling, such that transmission efficiency of the MDT configuration information is improved.

Figure 4:
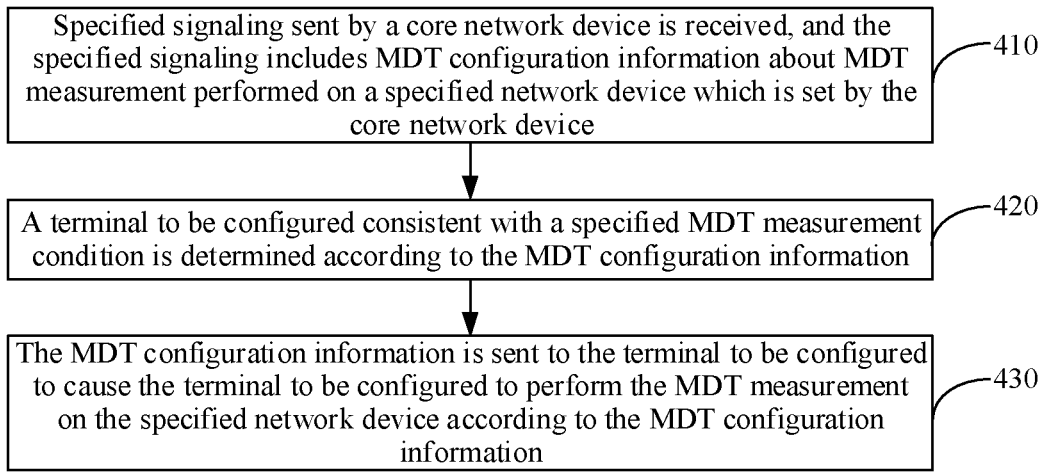
FIG. 4 is a flow chart showing an MDT configuration method, according to an exemplary embodiment.

FIG. 4 is a flow chart showing an MDT configuration method, according to an exemplary embodiment. The MDT configuration method may be applied to a base station. As illustrated in FIG. 4, the MDT configuration method may include steps 410 to 430 as follows.

In step 410, specified signaling sent by a core network device is received, and the specified signaling includes MDT configuration information about MDT measurement performed on a specified network device which is set by the core network device.

In the embodiment of the present disclosure, the base station may acquire the MDT configuration information set by the core network from the specified signaling. The specified signaling may be existing signaling. For example, first signaling is initial context setup request signaling.

In an embodiment, the specified signaling is initial context setup request signaling, and the initial context setup request signaling includes a tracking activation information element. The tracking activation information element includes an MDT configuration signaling element, and the MDT configuration signaling element includes the MDT configuration information.

In this manner, the base station may acquire the MDT configuration information set by the core network from the MDT configuration signaling element in the initial context setup request signaling.

In addition, the base station, after acquiring the MDT configuration information set by the core network, may learn according to the MDT configuration information that the core network device supports MDT measurement over the specified network device and the core network device requires a proper terminal to be selected to perform the MDT measurement on the specified network device, and may obtain a measurement parameter configured by the core network device and required by MDT measurement over the specified network device.

In an embodiment, the specified network device may be a BT device and/or a WLAN device, and the MDT configuration information set by the core network may include: (1) an MDT mode for BT and/or WLAN MDT measurement; and/or, (2) measurement region information for BT and/or WLAN MDT measurement; and/or, (3) information of BT device required to be measured; and/or, (4) SSID information of the WLAN device required to be measured. The MDT mode may be real-time MDT and may also be stored MDT.

In step 420, a terminal to be configured consistent with a specified MDT measurement condition is determined according to the MDT configuration information.

In the embodiment of the present disclosure, the base station may select the terminal to be configured consistent with the specified MDT measurement condition from terminals in its coverage.

The specified MDT measurement condition may include: having a capability of supporting MDT measurement over the specified network device, and may further include: being in a measurement region for MDT measurement over the specified network device.

For example, the specified network device may be the BT device and/or the WLAN device, and the specified MDT measurement condition may include: having a capability of supporting BT and/or WLAN MDT measurement (that is, a capability of supporting measurement over the BT device and/or the WLAN device) and may further include being in a measurement region for BT and/or WLAN MDT measurement.

In step 430, the MDT configuration information is sent to the terminal to be configured to cause the terminal to be configured to perform the MDT measurement on the specified network device according to the MDT configuration information.

In an embodiment, when the MDT configuration information is sent to the terminal to be configured, the MDT configuration information may be added to RRC signaling, and then the RRC signaling is sent to the terminal to be configured; and in such a manner, the terminal to be configured may acquire the MDT configuration information from the RRC signaling, such that transmission reliability of the MDT configuration information is improved.

It can be seen from the embodiment that the specified signaling sent by the core network device is received, the specified signaling including the MDT configuration information about the MDT measurement performed on the specified network device which is set by the core network device, the terminal to be configured consistent with the specified MDT measurement condition is determined according to the MDT configuration information, and the MDT configuration information is sent to the terminal to be configured to cause the terminal to be configured to perform the MDT measurement on the specified network device according to the MDT configuration information, such that configuration of specified network device-based MDT measurement for the terminal by the core network device is implemented, and the reliability of MDT measurement is improved.

Figure 5:
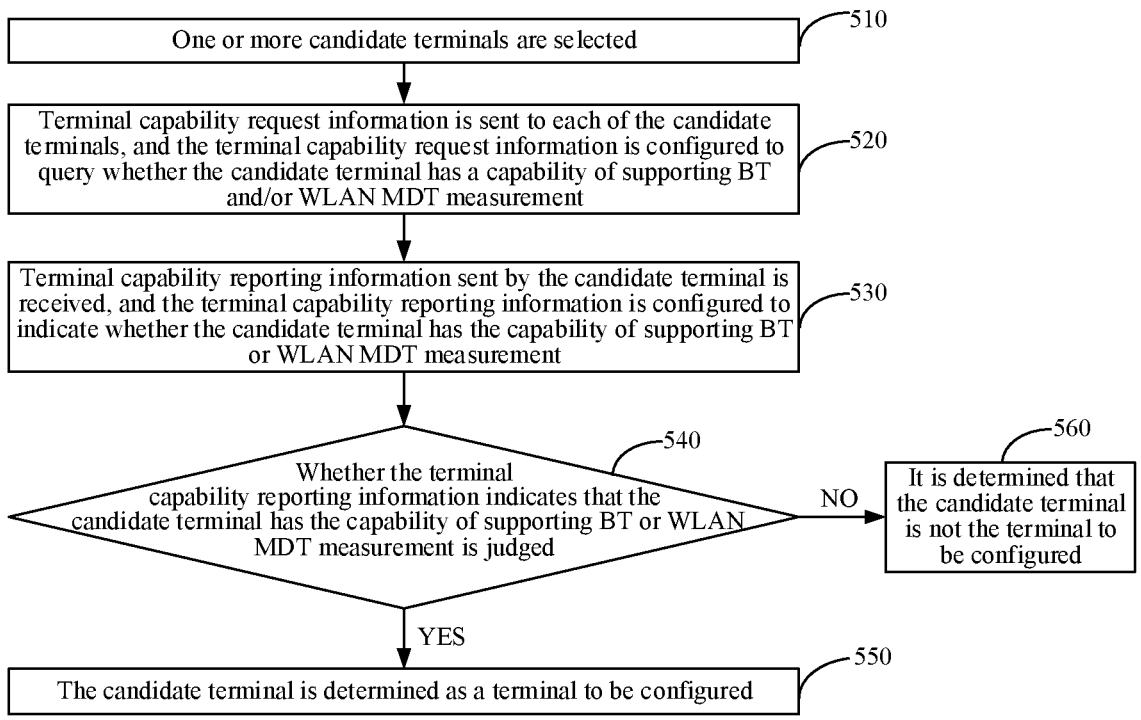
FIG. 5 is a flow chart showing another MDT configuration method, according to an exemplary embodiment.

FIG. 5 is a flow chart showing another MDT configuration method, according to an exemplary embodiment. The MDT configuration method may be applied to a base station and is established based on the method illustrated in FIG. 4. The specified network device includes the BT device and/or the WLAN device. The specified MDT measurement condition includes having the capability of supporting BT and/or WLAN MDT measurement. When step 420 is executed, as illustrated in FIG. 5, steps 510 to 560 may be included as follows.

In step 510, one or more candidate terminals are selected. The candidate terminal may be a terminal selected by the base station from terminals in its coverage.

In step 520, terminal capability request information is sent to each of the candidate terminals, and the terminal capability request information is configured to query whether the candidate terminal has the capability of supporting BT and/or WLAN MDT measurement.

In step 530, terminal capability reporting information sent by the candidate terminal is received, and the terminal capability reporting information is configured to indicate whether the candidate terminal has the capability of supporting BT or WLAN MDT measurement.

In step 540, whether the terminal capability reporting information indicates that the candidate terminal has the capability of supporting BT or WLAN MDT measurement is judged; if YES, step 550 is executed; otherwise, step 560 is executed.

In step 550, the candidate terminal is determined as the terminal to be configured.

In step 560, it is determined that the candidate terminal is not the terminal to be configured.

It can be seen from the embodiment that the terminal capability request information is sent to the candidate terminals, the terminal capability reporting information sent by the candidate terminals is received, and whether a candidate terminal has the capability of supporting BT or WLAN MDT measurement is determined according to the terminal capability reporting information, such that reliability of determining the terminal to be configured is improved.

Figure 6:
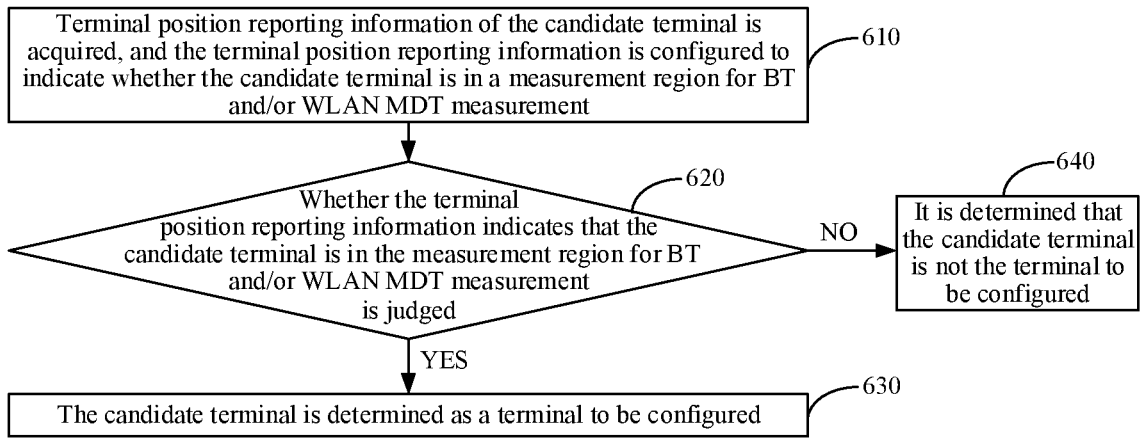
FIG. 6 is a flow chart showing another MDT configuration method, according to an exemplary embodiment.

FIG. 6 is a flow chart showing another MDT configuration method, according to an exemplary embodiment. The MDT configuration method may be applied to a base station and is established based on the method illustrated in FIG. 5. The specified MDT measurement condition further includes being in the measurement region for BT and/or WLAN MDT measurement. When step 550 is executed, as illustrated in FIG. 6, steps 610 to 640 may be included as follows.

In step 610, terminal position reporting information of the candidate terminal is acquired, and the terminal position reporting information is configured to indicate whether the candidate terminal is in the measurement region for BT and/or WLAN MDT measurement.

In step 620, whether the terminal position reporting information indicates that the candidate terminal is in the measurement region for BT and/or WLAN MDT measurement is judged; if YES, step 630 is executed; otherwise, step 640 is executed.

In step 630, the candidate terminal is determined as the terminal to be configured.

In step 640, it is determined that the candidate terminal is not the terminal to be configured.

It can be seen from the embodiment that the terminal position reporting information of the candidate terminal is acquired, and whether the candidate terminal is in the measurement region for BT and/or WLAN MDT measurement is determined according to the terminal position reporting information, such that accuracy of determining the terminal to be configured is improved.

Figure 7:
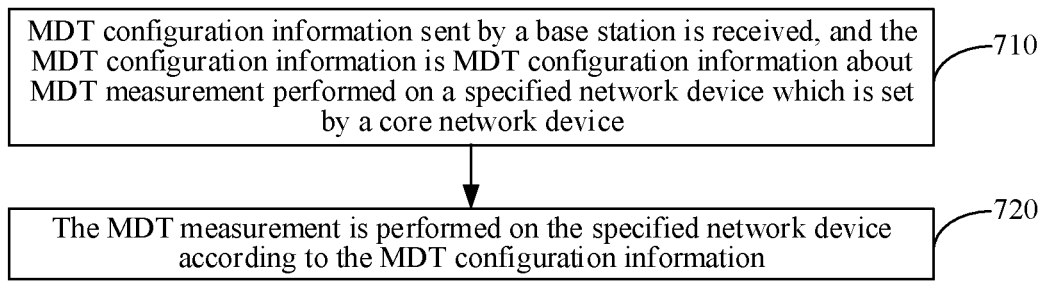
FIG. 7 is a flow chart showing an MDT configuration method, according to an exemplary embodiment.

FIG. 7 is a flow chart showing an MDT configuration method, according to an exemplary embodiment. The MDT configuration method may be applied to a terminal to be configured. The terminal to be configured may be a terminal which is determined by a base station according to MDT configuration information about MDT measurement performed on a specified network device set by a core network device and is consistent with a specified MDT measurement condition. As illustrated in FIG. 7, the MDT configuration method may include steps 710 to 720 as follows.

In step 710, MDT configuration information sent by the base station is received, and the MDT configuration information is the MDT configuration information about the MDT measurement performed on the specified network device which is set by the core network device.

In step 720, the MDT measurement is performed on the specified network device according to the MDT configuration information.

In the embodiment of the present disclosure, the terminal may perform the MDT measurement on the specified network device according to the MDT configuration information set by the core network.

In an embodiment, the specified network device may be a BT device and/or a WLAN device. The MDT configuration information set by the core network may include: (1) an MDT mode for BT and/or WLAN MDT measurement; and/or, (2) measurement region information for BT and/or WLAN MDT measurement; and/or, (3) information of BT device required to be measured; and/or, (4) SSID information of the WLAN device required to be measured. The MDT mode may be real-time MDT and may also be stored MDT.

For example, the MDT mode configured by the core network is real-time MDT, and in such case, the terminal may perform MDT measurement on the BT device and/or the WLAN device according to the real-time MDT mode.

For another example, the core network configures a measurement region, and in such case, the terminal may perform MDT measurement on a BT device and/or WLAN device in the measurement region.

For another example, the core network configures the information of BT device, and in such case, the terminal may perform MDT measurement on a BT device in the information of BT device.

It can be seen from the embodiment that the MDT configuration information sent by the base station is received, the MDT configuration information being the MDT configuration information about the MDT measurement performed on the specified network device which is set by the core network device, and the MDT measurement is performed on the specified network device according to the MDT configuration information, such that the MDT measurement is implemented according to a configuration of the core network device, and the efficiency of MDT measurement is improved.

Figure 8:
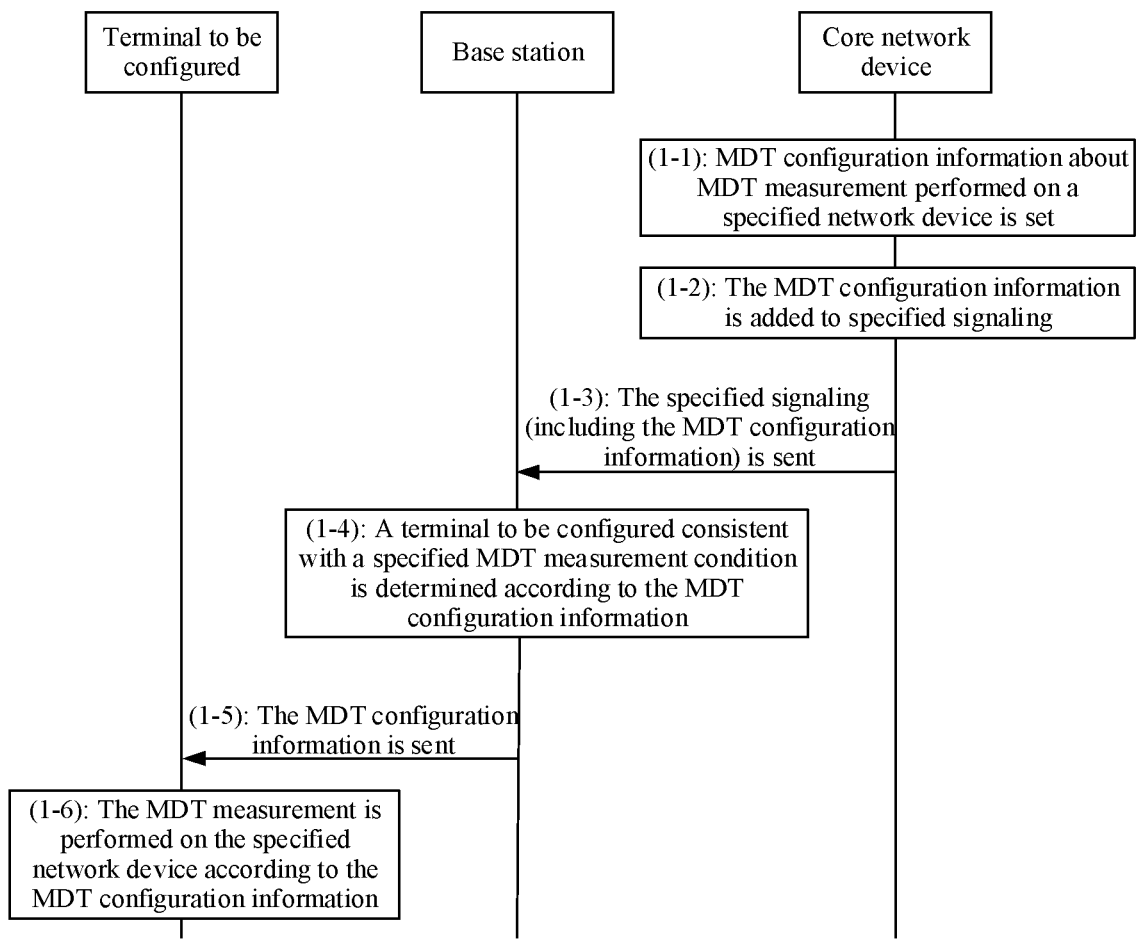
FIG. 8 is an information interaction diagram of an MDT configuration method, according to an exemplary embodiment.

FIG. 8 is an information interaction diagram of an MDT configuration method, according to an exemplary embodiment. As illustrated in FIG. 8, a terminal to be configured, a base station and a core network device are included. The terminal to be configured is a terminal determined by the base station according to MDT configuration information about MDT measurement performed on a specified network device which is set by the core network device and consistent with a specified MDT measurement condition. Moreover, an information interaction process of the terminal to be configured, the base station and the core network device is specifically as follows.

In (1-1), the core network device sets the MDT configuration information about MDT measurement performed on the specified network device.

In (1-2), the core network device adds the MDT configuration information to specified signaling, and the specified signaling includes the MDT configuration information.

In (1-3), the core network device sends the specified signaling to the base station.

In (1-4), the base station determines the terminal to be configured consistent with the specified MDT measurement condition according to the MDT configuration information.

In (1-5), the base station sends the MDT configuration information to the terminal to be configured.

In (1-6), the terminal to be configured performs the MDT measurement on the specified network device according to the MDT configuration information.

Figure 9:
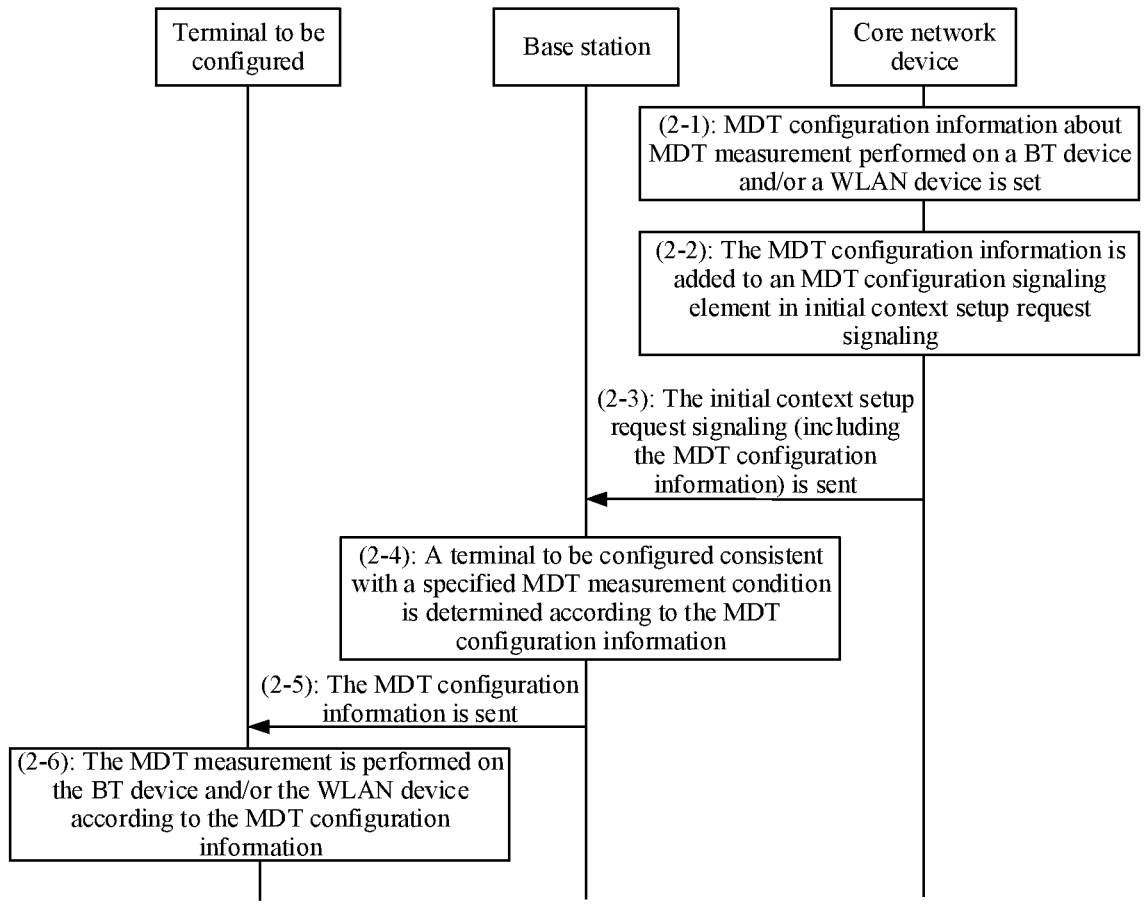
FIG. 9 is an information interaction diagram of another MDT configuration method, according to an exemplary embodiment.

FIG. 9 is an information interaction diagram of another MDT configuration method, according to an exemplary embodiment. As illustrated in FIG. 8, a terminal to be configured, a base station and a core network device are included. The terminal to be configured is a terminal determined by the base station according to MDT configuration information about MDT measurement performed on a BT device and/or a WLAN device which is set by the core network device and consistent with a specified MDT measurement condition. Moreover, an information interaction process of the terminal to be configured, the base station and the core network device is specifically as follows.

In (2-1), the core network device sets the MDT configuration information about MDT measurement performed on the BT device and/or the WLAN device.

In (2-2), the core network device adds the MDT configuration information to an MDT configuration signaling element in initial context setup request signaling.

In (2-3), the core network device sends the initial context setup request signaling to the base station, and the initial context setup request signaling includes the MDT configuration information.

In (2-4), the base station determines the terminal to be configured consistent with the specified MDT measurement condition according to the MDT configuration information.

In (2-5), the base station sends the MDT configuration information to the terminal to be configured.

In (2-6), the terminal to be configured performs the MDT measurement on the BT device and/or the WLAN device according to the MDT configuration information.

Corresponding to the embodiments of the MDT configuration methods, the present disclosure also provides embodiments of MDT configuration apparatuses.

Figure 10:
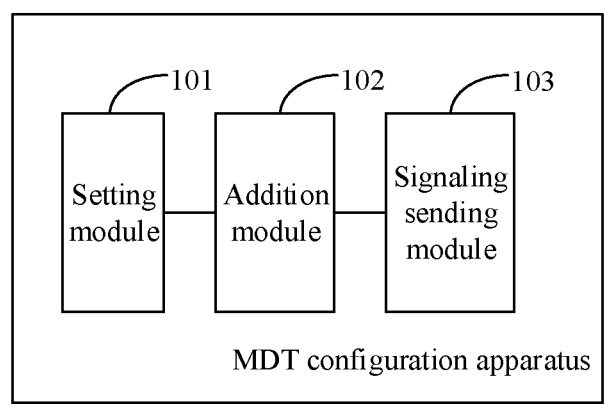
FIG. 10 is a block diagram of an MDT configuration apparatus, according to an exemplary embodiment.

FIG. 10 is a block diagram of an MDT configuration apparatus, according to an exemplary embodiment. The device is applied to a core network device, and is configured to execute the MDT configuration method illustrated in FIG. 1. As illustrated in FIG. 10, the MDT configuration apparatus may include: a setting module 101, an addition module 102, and a signaling sending module 103.

The setting module 101 is configured to set MDT configuration information about MDT measurement performed on a specified network device.

The addition module 102 is configured to add the MDT configuration information to specified signaling.

The signaling sending module 103 is configured to send the specified signaling to a base station to cause the base station to, after determining a terminal to be configured consistent with a specified MDT measurement condition according to the MDT configuration information, send the MDT configuration information to the terminal to be configured to cause the terminal to be configured to perform the MDT measurement on the specified network device according to the MDT configuration information.

It can be seen from the embodiment that the MDT configuration information about MDT measurement performed on the specified network device is set, the MDT configuration information is added to the specified signaling, and the specified signaling is sent to the base station. The base station, after determining the terminal to be configured consistent with the specified MDT measurement condition according to the MDT configuration information, may send the MDT configuration information to the terminal to be configured to cause the terminal to be configured to perform the MDT measurement on the specified network device according to the MDT configuration information, such that configuration of specified network device-based MDT measurement for the terminal by the core network device is implemented, and the reliability of MDT measurement is improved.

In an embodiment, based on the device illustrated in FIG. 10, the specified network device includes a BT device and/or a WLAN device.

In an embodiment, based on the device illustrated in FIG. 10, the MDT configuration information for the specified network device includes: an MDT mode for BT and/or WLAN MDT measurement; and/or measurement region information for BT and/or WLAN MDT measurement; and/or information of BT device required to be measured; and/or SSID information of the WLAN device required to be measured.

In an embodiment, the MDT mode includes real-time MDT or stored MDT.

Figure 11:
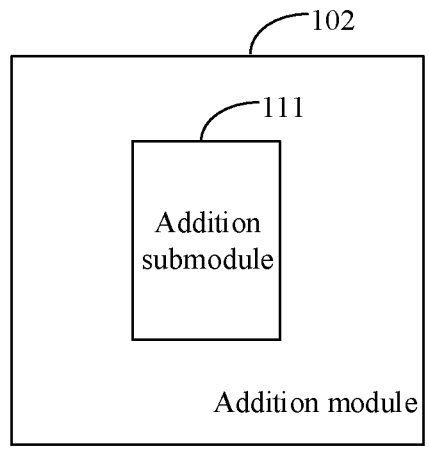
FIG. 11 is a block diagram of another MDT configuration apparatus, according to an exemplary embodiment.

In an embodiment, based on the device illustrated in FIG. 10, the specified signaling is initial context setup request signaling which includes a tracking activation information element, and the tracking activation information element includes an MDT configuration signaling element. As illustrated in FIG. 11, the addition module 102 includes: an addition submodule 111, configured to add the MDT configuration information to the MDT configuration signaling element.

It can be seen from the embodiment that the MDT configuration information is added to the MDT configuration signaling element in the initial context setup request signaling, and then the initial context setup request signaling is sent to the base station to cause the base station to acquire the MDT configuration information from the initial context setup request signaling, such that the transmission efficiency of the MDT configuration information is improved.

Figure 12:
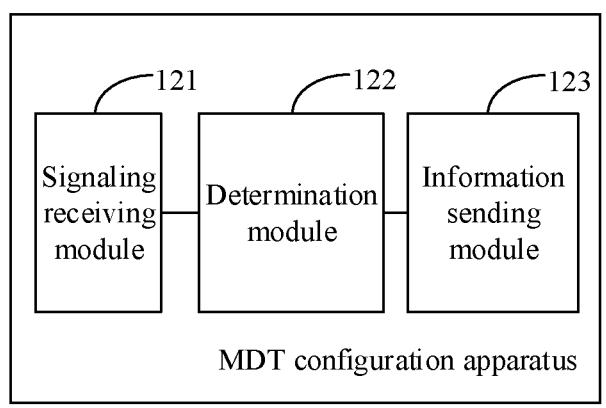
FIG. 12 is a block diagram of an MDT configuration apparatus, according to an exemplary embodiment.

FIG. 12 is a block diagram of an MDT configuration apparatus, according to an exemplary embodiment. The device is applied to a base station, and is configured to execute the MDT configuration method illustrated in FIG. 4. As illustrated in FIG. 12, the MDT configuration apparatus may include: a signaling receiving module 121, a determination module 122, and an information sending module 123.

The signaling receiving module 121 is configured to receive specified signaling sent by a core network device, and the specified signaling includes MDT configuration information about MDT measurement performed on a specified network device which is set by the core network device.

The determination module 122 is configured to determine a terminal to be configured consistent with a specified MDT measurement condition according to the MDT configuration information.

The information sending module 123 is configured to send the MDT configuration information to the terminal to be configured to cause the terminal to be configured to perform the MDT measurement on the specified network device according to the MDT configuration information.

It can be seen from the embodiment that the specified signaling sent by the core network device is received, the specified signaling including the MDT configuration information about the MDT measurement performed on the specified network device which is set by the core network device, the terminal to be configured consistent with the specified MDT measurement condition is determined according to the MDT configuration information, and the MDT configuration information is sent to the terminal to be configured to cause the terminal to be configured to perform the MDT measurement on the specified network device according to the MDT configuration information, such that configuration of specified network device-based MDT measurement for the terminal by the core network device is implemented, and the reliability of MDT measurement is improved.

In an embodiment, based on the device illustrated in FIG. 12, the specified signaling is initial context setup request signaling which includes a tracking activation information element, the tracking activation information element includes an MDT configuration signaling element, and the MDT configuration signaling element includes the MDT configuration information.

In an embodiment, based on the device illustrated in FIG. 12, the specified network device includes a BT device and/or a WLAN device.

In an embodiment, based on the device illustrated in FIG. 12, the specified MDT measurement condition includes having a capability of supporting BT and/or WLAN MDT measurement.

Figure 13:
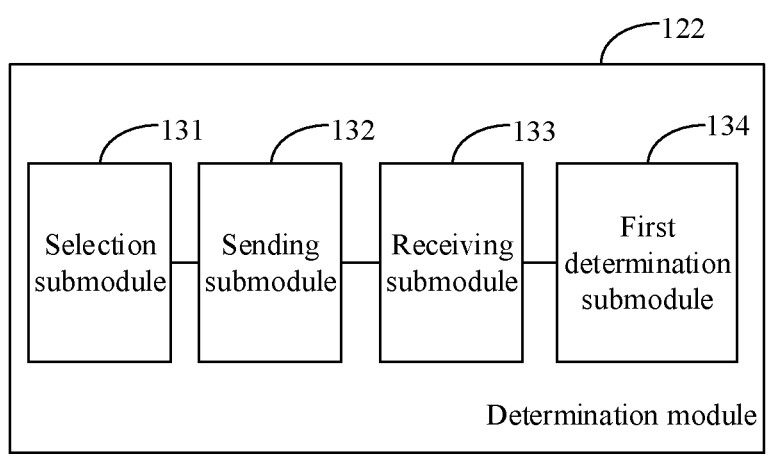
FIG. 13 is a block diagram of another MDT configuration apparatus, according to an exemplary embodiment.

In an embodiment, based on the device illustrated in FIG. 12, the determination module 122 as illustrated in FIG. 13 may include: a selection submodule 131, a sending submodule 132, a receiving submodule 133, and a first determination submodule 134.

The selection submodule 131 is configured to select one or more candidate terminals.

The sending submodule 132 is configured to send terminal capability request information to each of the candidate terminals, and the terminal capability request information is configured to query whether the candidate terminal has the capability of supporting BT and/or WLAN MDT measurement.

The receiving submodule 133 is configured to receive terminal capability reporting information sent by the candidate terminal, and the terminal capability reporting information is configured to indicate whether the candidate terminal has the capability of supporting BT or WLAN MDT measurement.

The first determination submodule 134 is configured to, if the terminal capability reporting information indicates that the candidate terminal has the capability of supporting BT or WLAN MDT measurement, determine the candidate terminal as the terminal to be configured.

It can be seen from the embodiment that the terminal capability request information is sent to the candidate terminals, the terminal capability reporting information sent by the candidate terminals is received, and whether a candidate terminal has the capability of supporting BT or WLAN MDT measurement is determined according to the terminal capability reporting information, such that the reliability of determining the terminal to be configured is improved.

Figure 14:
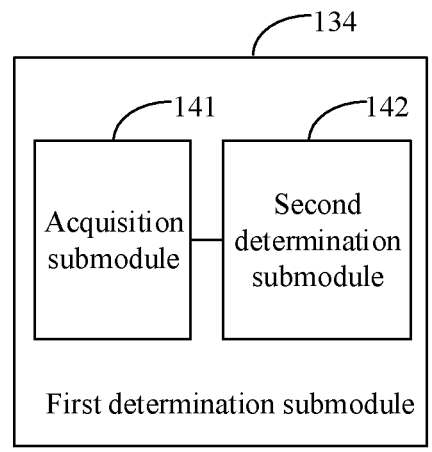
FIG. 14 is a block diagram of another MDT configuration apparatus, according to an exemplary embodiment.

In an embodiment, based on the device illustrated in FIG. 13, the specified MDT measurement condition further includes being in a measurement region for BT and/or WLAN MDT measurement; and as illustrated in FIG. 14, the first determination submodule 134 may include: an acquisition submodule 141, and a second determination submodule 142.

The acquisition submodule 141 is configured to acquire terminal position reporting information of the candidate terminal, and the terminal position reporting information is configured to indicate whether the candidate terminal is in the measurement region for BT and/or WLAN MDT measurement.

The second determination submodule 142 is configured to, if the terminal position reporting information indicates that the candidate terminal is in the measurement region for BT and/or WLAN MDT measurement, determine the candidate terminal as the terminal to be configured.

It can be seen from the embodiment that the terminal position reporting information of the candidate terminal is acquired, and whether the candidate terminal is in the measurement region for BT and/or WLAN MDT measurement is determined according to the terminal position reporting information, such that the accuracy of determining the terminal to be configured is improved.

Figure 15:
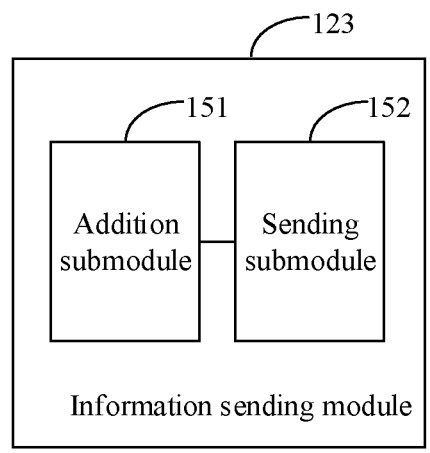
FIG. 15 is a block diagram of another MDT configuration apparatus, according to an exemplary embodiment.

In an embodiment, based on the device illustrated in FIG. 12, the information sending module 123 as illustrated in FIG. 15 may include: an addition submodule 151 configured to add the MDT configuration information to RRC signaling; and a sending submodule 152 configured to send the RRC signaling to the terminal to be configured to cause the terminal to be configured to acquire the MDT configuration information from the RRC signaling.

It can be seen from the embodiment that the MDT configuration information is added to the RRC signaling, and then the RRC signaling is sent to the terminal to be configured; and in such a manner, the terminal to be configured may acquire the MDT configuration information from the RRC signaling, such that the transmission reliability of the MDT configuration information is improved.

Figure 16:
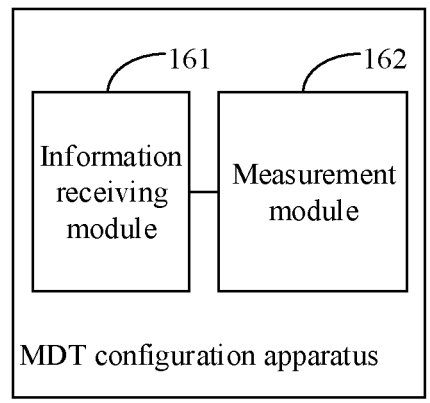
FIG. 16 is a block diagram of an MDT configuration apparatus, according to an exemplary embodiment.

FIG. 16 is a block diagram of an MDT configuration apparatus, according to an exemplary embodiment. The MDT configuration apparatus is applied to a terminal to be configured, the terminal to be configured being a terminal determined by a base station according to MDT configuration information about MDT measurement performed on a specified network device which is set by a core network device and consistent with a specified MDT measurement condition, and is configured to execute the MDT configuration method illustrated in FIG. 7. As illustrated in FIG. 16, the MDT configuration apparatus may include: an information receiving module 161 and a measurement module 162.

The information receiving module 161 is configured to receive MDT configuration information sent by the base station, and the MDT configuration information is the MDT configuration information about the MDT measurement performed on the specified network device which is set by the core network device.

The measurement module 162 is configured to perform the MDT measurement on the specified network device according to the MDT configuration information.

In an embodiment, based on the device illustrated in FIG. 16, the specified network device includes a BT device and/or a WLAN device.

It can be seen from the embodiment that the MDT configuration information sent by the base station is received, the MDT configuration information being the MDT configuration information about the MDT measurement performed on the specified network device which is set by the core network device, and the MDT measurement is performed on the specified network device according to the MDT configuration information, such that the MDT measurement is implemented according to a configuration of the core network device, and the efficiency of MDT measurement is improved.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure also provides a non-transitory computer-readable storage medium, in which a computer program is stored, wherein the computer program is configured to execute any MDT configuration method illustrated in FIG. 1 to FIG. 3.

Correspondingly, the present disclosure also provides a non-transitory computer-readable storage medium, in which a computer program is stored, wherein the computer program is configured to execute any MDT configuration method illustrated in FIG. 4 to FIG. 6.

Correspondingly, the present disclosure also provides a non-transitory computer-readable storage medium, in which a computer program is stored, wherein the computer program is configured to execute the MDT configuration method illustrated in FIG. 7.

Correspondingly, the present disclosure also provides an MDT configuration apparatus, which is applied to a core network device and includes:

a processor; and a memory configured to store instructions executable by the processor, wherein the processor is configured to:

set MDT configuration information about MDT measurement performed on a specified network device;

add the MDT configuration information to specified signaling; and send the specified signaling to a base station to cause the base station to, after determining a terminal to be configured consistent with a specified MDT measurement condition according to the MDT configuration information, send the MDT configuration information to the terminal to be configured to cause the terminal to be configured to perform the MDT measurement on the specified network device according to the MDT configuration information.

Figure 17:
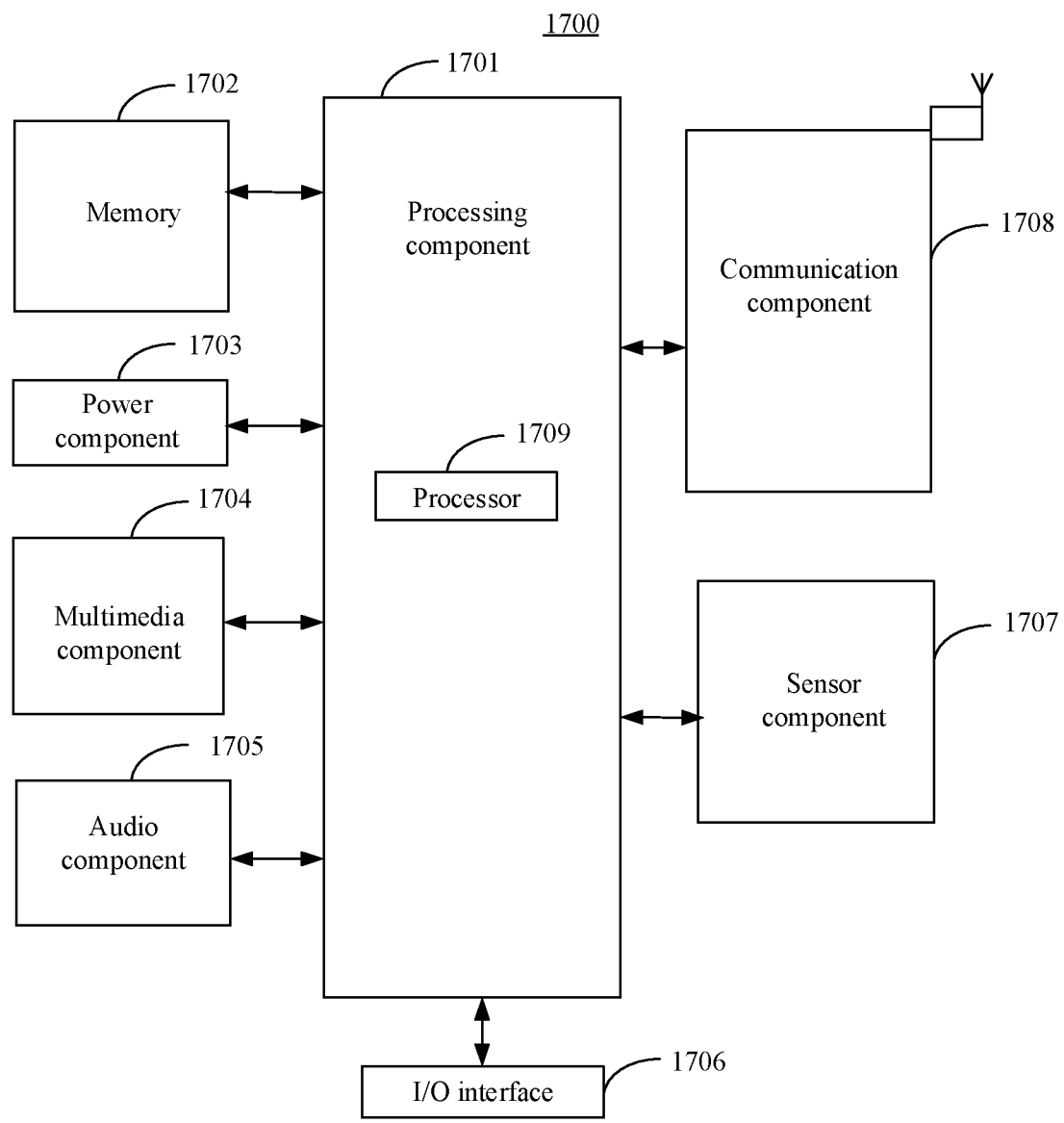
FIG. 17 is a structure diagram of an MDT configuration apparatus, according to an exemplary embodiment.

FIG. 17 is a structure diagram of an MDT configuration apparatus, according to an exemplary embodiment. FIG. 17 illustrates an MDT configuration apparatus 1700 according to the exemplary embodiment. The device 1700 may be provided as a core network device, for example, an MME.

Referring to FIG. 17, the device 1700 may include one or more of the following components: a processing component 1701, a memory 1702, a power component 1703, a multimedia component 1704, an audio component 1705, an input/output (I/O) interface 1706, a sensor component 1707, and a communication component 1708.

The processing component 1701 typically controls overall operations of the device 1700, such as the operations associated with display, telephone calls, data communications, camera operations, and recording operations. The processing component 1701 may include one or more processors 1709 to execute instructions to perform all or part of the steps in the above-mentioned method. Moreover, the processing component 1701 may include one or more modules which facilitate interaction between the processing component 1701 and other components. For instance, the processing component 1701 may include a multimedia module to facilitate interaction between the multimedia component 1704 and the processing component 1701.

The memory 1702 is configured to store various types of data to support the operation of the device 1700. Examples of such data include instructions for any applications or methods operated on the device 1700, contact data, phonebook data, messages, pictures, video, etc. The memory 1702 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1703 provides power for various components of the device 1700. The power component 1703 may include a power management system, one or more power supplies, and other components associated with generation, management and distribution of power for the device 1700.

The multimedia component 1704 includes a screen providing an output interface between the device 1700 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a period of time and a pressure associated with the touch or swipe action. In some embodiments, the multimedia component 1704 includes a front camera and/or a rear camera. The front camera and/or the rear camera may receive external multimedia data when the device 1700 is in an operation mode, such as a photographing mode or a video mode. Each of the front camera and the rear camera may be a fixed optical lens system or have focusing and optical zooming capabilities.

The audio component 1705 is configured to output and/or input an audio signal. For example, the audio component 1705 includes a microphone (MIC), and the MIC is configured to receive an external audio signal when the device 1700 is in an operation mode, such as a call mode, a recording mode and a voice recognition mode. The received audio signal may further be stored in the memory 1702 or sent through the communication component 1708. In some embodiments, the audio component 1705 further includes a speaker configured to output the audio signal.

The I/O interface 1706 provides an interface between the processing component 1701 and peripheral interface modules, such as a keyboard, a click wheel, buttons, and the like. The buttons may include, but are not limited to: a home button, a volume button, a starting button and a locking button.

The sensor component 1707 includes one or more sensors configured to provide status assessments in various aspects for the device 1700. For instance, the sensor component 1707 may detect an on/off status of the device 1700 and relative positioning of components, such as a display and small keyboard of the device 1700, and the sensor component 1707 may further detect a change in a position of the device 1700 or a component of the device 1700, presence or absence of contact between the user and the device 1700, orientation or acceleration/deceleration of the device 1700 and a change in temperature of the device 1700. The sensor component 1707 may include a proximity sensor configured to detect presence of an object nearby without any physical contact. The sensor component 1707 may also include a light sensor, such as a complementary metal oxide semiconductor (CMOS) or charge coupled device (CCD) image sensor, configured for use in an imaging application. In some embodiments, the sensor component 1707 may also include an acceleration sensor, a gyroscope sensor, a magnetic sensor, a pressure sensor or a temperature sensor.

The communication component 1708 is configured to facilitate wired or wireless communication between the device 1700 and other devices. The device 1700 may access a communication-standard-based wireless network, such as a wireless fidelity (WiFi) network, a 2nd-generation (2G) or 3rd-generation (3G) network or a combination thereof. In an exemplary embodiment, the communication component 1708 receives a broadcast signal or broadcast associated information from an external broadcast management system through a broadcast channel. In an exemplary embodiment, the communication component 1708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a BT technology and other technologies.

In an exemplary embodiment, the device 1700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above-mentioned method.

In an exemplary embodiment, there is also provided a non-transitory computer-readable storage medium including instructions, such as included in the memory 1702, executed by the processor 1709 of the device 1700 to implement the above-mentioned method. For example, the non-transitory computer-readable storage medium may be a ROM, a random access memory (RAM), a compact disc read-only memory (CD-ROM), a magnetic tape, a floppy disc, an optical data storage device, and the like.

The instructions in the storage medium are executed by the processor to cause the device 1700 to execute any MDT configuration method.

Correspondingly, the present disclosure also provides an MDT configuration apparatus, which is applied to a base station and includes:
 a processor; and
 a memory configured to store instructions executable by the processor,
 wherein the processor is configured to:
 receive specified signaling sent by a core network device, the specified signaling including MDT configuration information about MDT measurement performed on a specified network device which is set by the core network device;
 determine a terminal to be configured consistent with a specified MDT measurement condition according to the MDT configuration information; and
 send the MDT configuration information to the terminal to be configured to cause the terminal to be configured to perform the MDT measurement on the specified network device according to the MDT configuration information.

Figure 18:
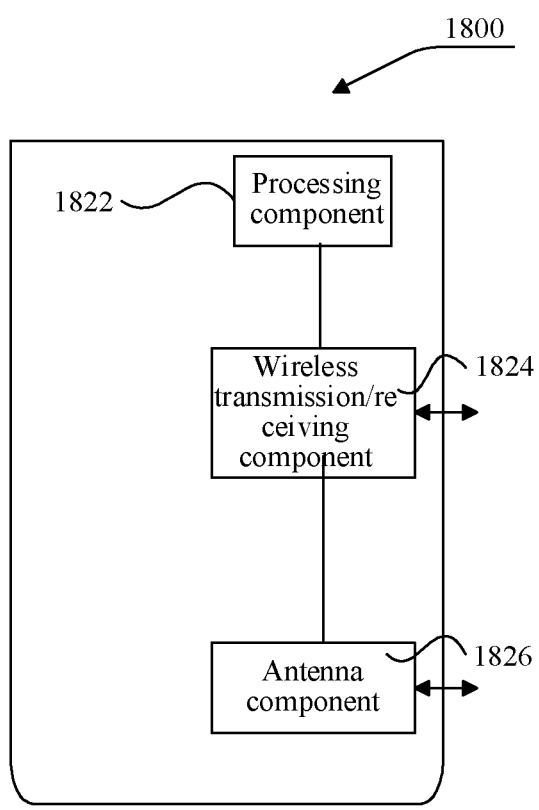
FIG. 18 is a structure diagram of an MDT configuration apparatus, according to an exemplary embodiment.

As illustrated in FIG. 18, FIG. 18 is a structure diagram of an MDT configuration apparatus, according to an exemplary embodiment. The device 1800 may be provided as a base station. Referring to FIG. 18, the device 1800 includes a processing component 1822, a wireless transmission/receiving component 1824, an antenna component 1826 and a wireless interface-specific signal processing part, and the processing component 1822 may further include one or more processors.

One processor in the processing component 1822 may be configured to execute any MDT configuration method.

Correspondingly, the present disclosure also provides an MDT configuration apparatus, which is applied to a terminal to be configured, and the terminal to be configured is a terminal determined by a base station according to MDT configuration information about MDT measurement performed on a specified network device which is set by a core network device and consistent with a specified MDT measurement condition. The device includes:
 a processor; and
 a memory configured to store instructions executable by the processor,
 wherein the processor is configured to:
 receive MDT configuration information sent by the base station, the MDT configuration information being the MDT configuration information about the MDT measurement performed on the specified network device which is set by the core network device; and
 perform the MDT measurement on the specified network device according to the MDT configuration information.

Figure 19:
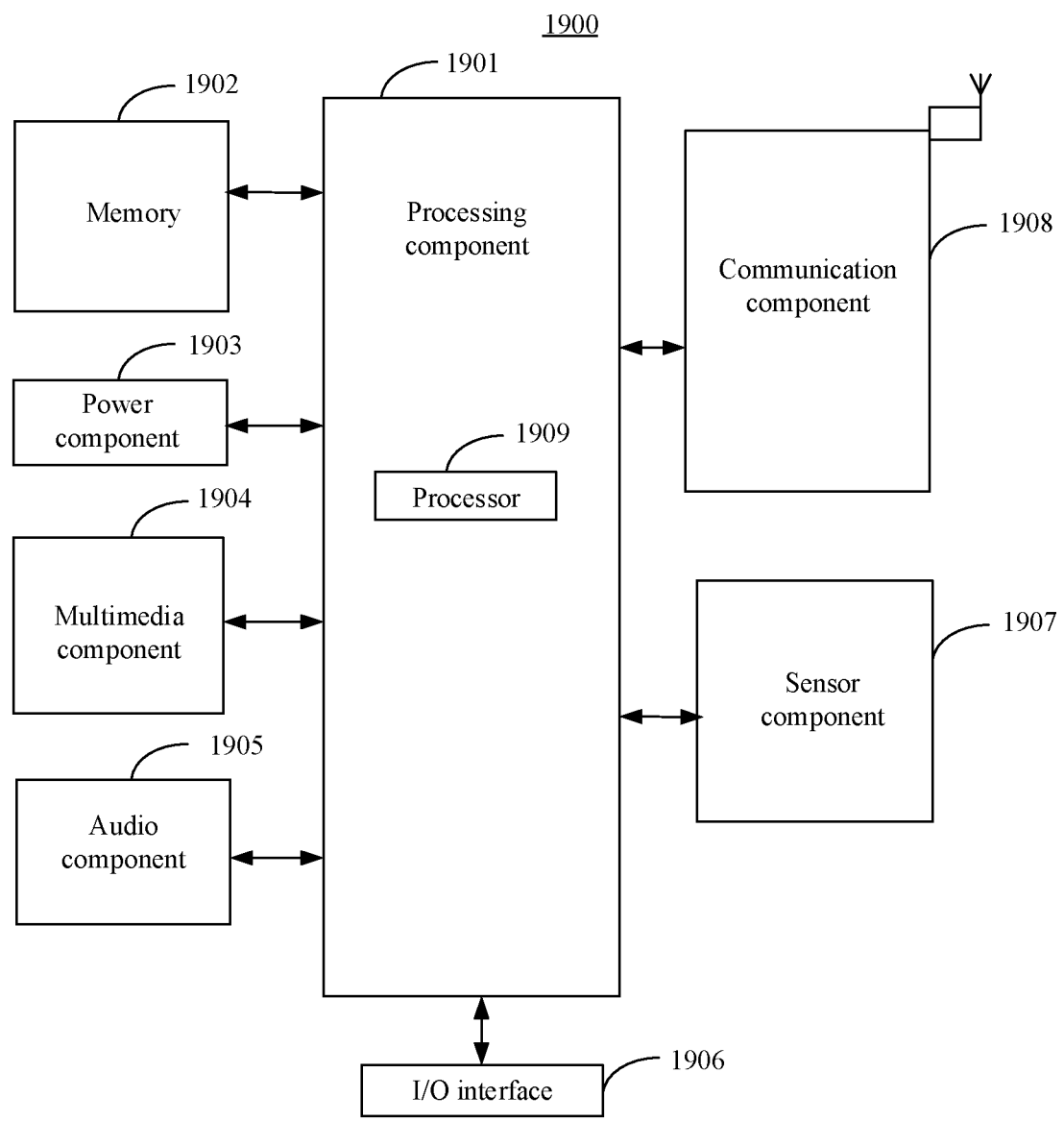
FIG. 19 is a structure diagram of an MDT configuration apparatus, according to an exemplary embodiment.

FIG. 19 is a structure diagram of an MDT configuration apparatus, according to an exemplary embodiment. FIG. 19 illustrates an MDT configuration apparatus 1900 according to an exemplary embodiment. The device 1900 may be a terminal such as a computer, a mobile phone, a digital broadcast terminal, a messaging device, a gaming console, a tablet, a medical device, exercise equipment, a personal digital assistant, and the like.

Referring to FIG. 19, the device 1900 may include one or more of the following components: a processing component 1901, a memory 1902, a power component 1903, a multimedia component 1904, an audio component 1905, an I/O interface 1906, a sensor component 1907, and a communication component 1908.

The processing component 1901 typically controls overall operations of the device 1900, such as the operations associated with display, telephone calls, data communications, camera operations, and recording operations. The processing component 1901 may include one or more processors 1909 to execute instructions to perform all or part of the steps in the above-mentioned method. Moreover, the processing component 1901 may include one or more modules which facilitate interaction between the processing component 1901 and other components. For instance, the processing component 1901 may include a multimedia module to facilitate interaction between the multimedia component 1904 and the processing component 1901.

The memory 1902 is configured to store various types of data to support the operation of the device 1900. Examples of such data include instructions for any applications or methods operated on the device 1900, contact data, phonebook data, messages, pictures, video, etc. The memory 1902 may be implemented by any type of volatile or non-volatile memory devices, or a combination thereof, such as an SRAM, an EEPROM, an EPROM, a PROM, a ROM, a magnetic memory, a flash memory, and a magnetic or optical disk.

The power component 1903 provides power for various components of the device 1900. The power component 1903 may include a power management system, one or more power supplies, and other components associated with generation, management and distribution of power for the device 1900.

The multimedia component 1904 includes a screen providing an output interface between the device 1900 and a user. In some embodiments, the screen may include an LCD and a TP. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a period of time and a pressure associated with the touch or swipe action. In some embodiments, the multimedia component 1904 includes a front camera and/or a rear camera. The front camera and/or the rear camera may receive external multimedia data when the device 1900 is in an operation mode, such as a photographing mode or a video mode. Each of the front camera and the rear camera may be a fixed optical lens system or have focusing and optical zooming capabilities.

The audio component 1905 is configured to output and/or input an audio signal. For example, the audio component 1905 includes a MIC, and the MIC is configured to receive an external audio signal when the device 1900 is in an operation mode, such as a call mode, a recording mode and a voice recognition mode. The received audio signal may further be stored in the memory 1902 or sent through the communication component 1908. In some embodiments, the audio component 1905 further includes a speaker configured to output the audio signal.

The I/O interface 1906 provides an interface between the processing component 1901 and peripheral interface modules, such as a keyboard, a click wheel, buttons, and the like. The buttons may include, but are not limited to: a home button, a volume button, a starting button and a locking button.

The sensor component 1907 includes one or more sensors configured to provide status assessments in various aspects for the device 1900. For instance, the sensor component 1907 may detect an on/off status of the device 1900 and relative positioning of components, such as a display and small keyboard of the device 1900, and the sensor component 1907 may further detect a change in a position of the device 1900 or a component of the device 1900, presence or absence of contact between the user and the device 1900, orientation or acceleration/deceleration of the device 1900 and a change in temperature of the device 1900. The sensor component 1907 may include a proximity sensor configured to detect presence of an object nearby without any physical contact. The sensor component 1907 may also include a light sensor, such as a CMOS or CCD image sensor, configured for use in an imaging application. In some embodiments, the sensor component 1907 may also include an acceleration sensor, a gyroscope sensor, a magnetic sensor, a pressure sensor or a temperature sensor.

The communication component 1908 is configured to facilitate wired or wireless communication between the device 1900 and other devices. The device 1900 may access a communication-standard-based wireless network, such as a WiFi network, a 2G or 3G network or a combination thereof. In an exemplary embodiment, the communication component 1908 receives a broadcast signal or broadcast associated information from an external broadcast management system through a broadcast channel. In an exemplary embodiment, the communication component 1908 further includes an NFC module to facilitate short-range communications. For example, the NFC module may be implemented based on an RFID technology, an IrDA technology, a UWB technology, a BT technology and other technologies.

In an exemplary embodiment, the device 1900 may be implemented by one or more ASICs, DSPs, DSPDs, PLDs, FPGAs, controllers, micro-controllers, microprocessors or other electronic components, and is configured to execute the above-mentioned method.

In an exemplary embodiment, there is also provided a non-transitory computer-readable storage medium including instructions, such as included in the memory 1902, executed by the processor 1909 of the device 1900 to implement the above-mentioned method. For example, the non-transitory computer-readable storage medium may be a ROM, a RAM, a CD-ROM, a magnetic tape, a floppy disc, an optical data storage device, and the like.

The instructions in the storage medium are executed by the processor to cause the device 1900 to execute any MDT configuration method.

The technical solutions provided in the embodiments of the present disclosure may have the following beneficial effects:

In the present disclosure, the core network device may set the MDT configuration information about MDT measurement performed on the specified network device, add the MDT configuration information to the specified signaling and send the specified signaling to the base station. The base station, after determining the terminal to be configured consistent with the specified MDT measurement condition according to the MDT configuration information, may send the MDT configuration information to the terminal to be configured to cause the terminal to be configured to perform the MDT measurement on the specified network device according to the MDT configuration information, such that configuration of specified network device-based MDT measurement for the terminal by the core network device is implemented, and the reliability of MDT measurement is improved.

In the present disclosure, the base station may receive the specified signaling sent by the core network device, the specified signaling including the MDT configuration information about the MDT measurement performed on the specified network device which is set by the core network device, determine the terminal to be configured consistent with the specified MDT measurement condition according to the MDT configuration information and send the MDT configuration information to the terminal to be configured to cause the terminal to be configured to perform the MDT measurement on the specified network device according to the MDT configuration information, such that configuration of specified network device-based MDT measurement for the terminal by the core network device is implemented, and the reliability of MDT measurement is improved.

In the present disclosure, the terminal may receive the MDT configuration information sent by the base station, the MDT configuration information being the MDT configuration information about the MDT measurement performed on the specified network device which is set by the core network device, and perform the MDT measurement on the specified network device according to the MDT configuration information, such that MDT measurement is implemented according to a configuration of the core network device, and the efficiency of MDT measurement is improved.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A minimization of drive test (MDT) configuration method, applied to a core network device and comprising:
   setting MDT configuration information about an MDT measurement performed on a specified network device;
   adding the MDT configuration information to specified signaling; and
   sending the specified signaling to a base station to cause the base station to, in response to determining a terminal to be configured consistent with a specified MDT measurement condition according to the MDT configuration information, send the MDT configuration information to the terminal, and cause the terminal to perform the MDT measurement on the specified network device according to the MDT configuration information;
   wherein the specified MDT measurement condition comprises: having a capability of supporting MDT measurement over the specified network device, and being in a measurement region for MDT measurement over the specified network device.

2. The MDT configuration method of claim 1, wherein the specified network device comprises at least one of a Bluetooth (BT) device or a wireless local area network (WLAN) device.

3. The MDT configuration method of claim 2, wherein the MDT configuration information for the specified network device comprises:

an MDT mode for BT and/or WLAN MDT measurement; and/or
measurement region information for BT and/or WLAN MDT measurement; and/or
information of BT device required to be measured; and/or
service set identifier (SSID) information of the WLAN device required to be measured;
wherein the setting the MDT configuration information is configured to notify the base station that the core network device supports MDT measurement over the specified network device, notify the base station to select a proper terminal to perform the MDT measurement on the specified network device, and configure a measurement parameter required by the MDT measurement over the specified network device.

4. The MDT configuration method of claim 3, wherein the MDT mode comprises real-time MDT or stored MDT.

5. The MDT configuration method of claim 1, wherein adding the MDT configuration information to the specified signaling comprises:
adding the MDT configuration information to an MDT configuration signaling element, wherein the specified signaling is initial context setup request signaling, wherein the initial context setup request signaling comprises a tracking activation information element, and wherein the tracking activation information element comprises the MDT configuration signaling element.

6. A non-transitory computer-readable storage medium storing a plurality of programs for execution by a computing device having one or more processors, wherein the plurality of programs, when executed by the one or more processors, cause the computing device to perform the minimization of drive test (MDT) configuration method of claim 1.

7. A computing device comprising:
one or more processors; and
a non-transitory computer-readable storage medium storing instructions executable by the one or more processors,
wherein the one or more processors are configured to execute the minimization of drive test (MDT) configuration method of claim 1.

8. A minimization of drive test (MDT) configuration method, applied to a base station and comprising:
receiving specified signaling sent by a core network device, the specified signaling comprising MDT configuration information about an MDT measurement performed on a specified network device which is set by the core network device;
determining a terminal to be configured consistent with a specified MDT measurement condition according to the MDT configuration information; and
sending the MDT configuration information to the terminal and causing the terminal to perform the MDT measurement on the specified network device according to the MDT configuration information;
wherein the specified MDT measurement condition comprises: having a capability of supporting MDT measurement over the specified network device, and being in a measurement region for MDT measurement over the specified network device.

9. The MDT configuration method of claim 8, wherein the specified signaling is initial context setup request signaling, wherein the initial context setup request signaling comprises a tracking activation information element, wherein the tracking activation information element comprises an MDT configuration signaling element, and wherein the MDT configuration signaling element comprises the MDT configuration information.

10. The MDT configuration method of claim 8, wherein the specified network device comprises at least one of a Bluetooth (BT) device or a wireless local area network (WLAN) device.

11. The MDT configuration method of claim 10, wherein the specified MDT measurement condition comprises: having a capability of supporting BT and/or WLAN MDT measurement.

12. The MDT configuration method of claim 11, wherein determining the terminal to be configured consistent with the specified MDT measurement condition according to the MDT configuration information comprises:
   selecting one or more candidate terminals;
   sending terminal capability request information to at least one of the candidate terminals, wherein the terminal capability request information is configured to query whether the candidate terminal has the capability of supporting BT and/or WLAN MDT measurement;
   receiving terminal capability reporting information sent by the candidate terminal, wherein the terminal capability reporting information is configured to indicate whether the candidate terminal has the capability of supporting BT or WLAN MDT measurement; and
   determining, in response to the terminal capability reporting information indicating that the candidate terminal has the capability of supporting BT or WLAN MDT measurement, the candidate terminal as the terminal to be configured.

13. The MDT configuration method of claim 12, wherein determining the candidate terminal as the terminal to be configured comprises:
   acquiring terminal position reporting information of the candidate terminal, wherein the terminal position reporting information being configured to indicate whether the candidate terminal is in a measurement region for BT and/or WLAN MDT measurement, wherein the specified MDT measurement condition further comprises being in the measurement region for BT and/or WLAN MDT measurement; and
   determining, in response to the terminal position reporting information indicating that the candidate terminal is in the measurement region for BT and/or WLAN MDT measurement, the candidate terminal as the terminal to be configured.

14. The MDT configuration method of claim 8, wherein sending the MDT configuration information to the terminal to be configured comprises:
   adding the MDT configuration information to radio resource control (RRC) signaling; and
   sending the RRC signaling to the terminal and causing the terminal to acquire the MDT configuration information from the RRC signaling.

15. A non-transitory computer-readable storage medium storing a plurality of programs for execution by a computing device having one or more processors, wherein the plurality of programs, when executed by the one or more processors, cause the computing device to perform the minimization of drive test (MDT) configuration method of claim 8.

16. A computing device comprising:
   one or more processors; and
   a non-transitory computer-readable storage medium storing instructions executable by the one or more processors,
   wherein the one or more processors are configured to execute the minimization of drive test (MDT) configuration method of claim 8.

17. A minimization of drive test (MDT) configuration method, applied to a terminal to be configured, comprising:
   receiving MDT configuration information sent by a base station, wherein the MDT configuration information is an MDT configuration information about an MDT measurement performed on a specified network device which is set by a core network device, wherein the terminal to be configured is a terminal determined by the base station to be consistent with a specified MDT measurement condition according to the MDT configuration information about the MDT measurement performed on the specified network device which is set by the core network device; and
   performing the MDT measurement on the specified network device according to the MDT configuration information;
   wherein the specified MDT measurement condition comprises: having a capability of supporting MDT measurement over the specified network device, and being in a measurement region for MDT measurement over the specified network device.

18. The MDT configuration method of claim 17, wherein the specified network device comprises at least one of a Bluetooth (BT) device or a wireless local area network (WLAN) device.

19. A non-transitory computer-readable storage medium storing a plurality of programs for execution by a computing device having one or more processors, wherein the plurality of programs, when executed by the one or more processors, cause the computing device to perform the minimization of drive test (MDT) configuration method of claim 17.

20. A computing device, comprising:
   one or more processors; and
   a non-transitory computer-readable storage medium storing instructions executable by the one or more processors,
   wherein the one or more processors are configured to execute the minimization of drive test (MDT) configuration method of claim 17.

* * * * *